(12) United States Patent
Jeong et al.

(10) Patent No.: US 11,773,250 B2
(45) Date of Patent: Oct. 3, 2023

(54) THERMOPLASTIC ELASTOMER WITH ADHESION TO CROSS-LINKED ETHYLENE PROPYLENE DIENE RUBBERS

(71) Applicant: Kraiburg TPE Corp., Buford, GA (US)

(72) Inventors: Jae Hyeuk Jeong, Duluth, GA (US); Sehyun Kim, Johns Creek, GA (US); Yaw Boateng, Buford, GA (US)

(73) Assignee: Kraiburg TPE Corp., Buford, GA (US)

( * ) Notice: Subject to any disclaimer, the term of this patent is extended or adjusted under 35 U.S.C. 154(b) by 349 days.

(21) Appl. No.: 17/238,407

(22) Filed: Apr. 23, 2021

(65) Prior Publication Data
US 2022/0340738 A1  Oct. 27, 2022

(51) Int. Cl.
*C08L 53/02* (2006.01)
*C08L 23/16* (2006.01)
*C08L 23/12* (2006.01)

(52) U.S. Cl.
CPC ............. *C08L 53/02* (2013.01); *C08L 23/12* (2013.01); *C08L 23/16* (2013.01); *C08L 2205/03* (2013.01)

(58) Field of Classification Search
CPC ........ C08L 53/02; C08L 53/025; C08L 23/10; C08L 23/14; C08L 23/04; C08L 23/0815; C08L 23/06; C08L 23/08; C08L 23/0807
See application file for complete search history.

(56) References Cited

U.S. PATENT DOCUMENTS

2007/0054997 A1\*  3/2007  Pierini .................. C08F 110/06
524/109

\* cited by examiner

*Primary Examiner* — Jeffrey C Mullis
(74) *Attorney, Agent, or Firm* — Tautz & Schuhmacher LLC; Georg M. Hasselmann

(57) ABSTRACT

The invention relates to a thermoplastic elastomer with an excellent adhesion to cross-linked ethylene propylene diene rubber (EPDM) or rubber mixtures containing cross-linked EPDM. The invention also relates to the use of the thermoplastic elastomer according to the invention for producing a composite material with cross-linked EPDM or rubber mixtures containing cross-linked EPDM, as well as an article that comprises a thermoplastic elastomer according to the invention and cross-linked EPDM or rubber mixtures containing cross-linked EPDM. The present invention also relates to a process for producing a thermoplastic elastomer.

15 Claims, 1 Drawing Sheet

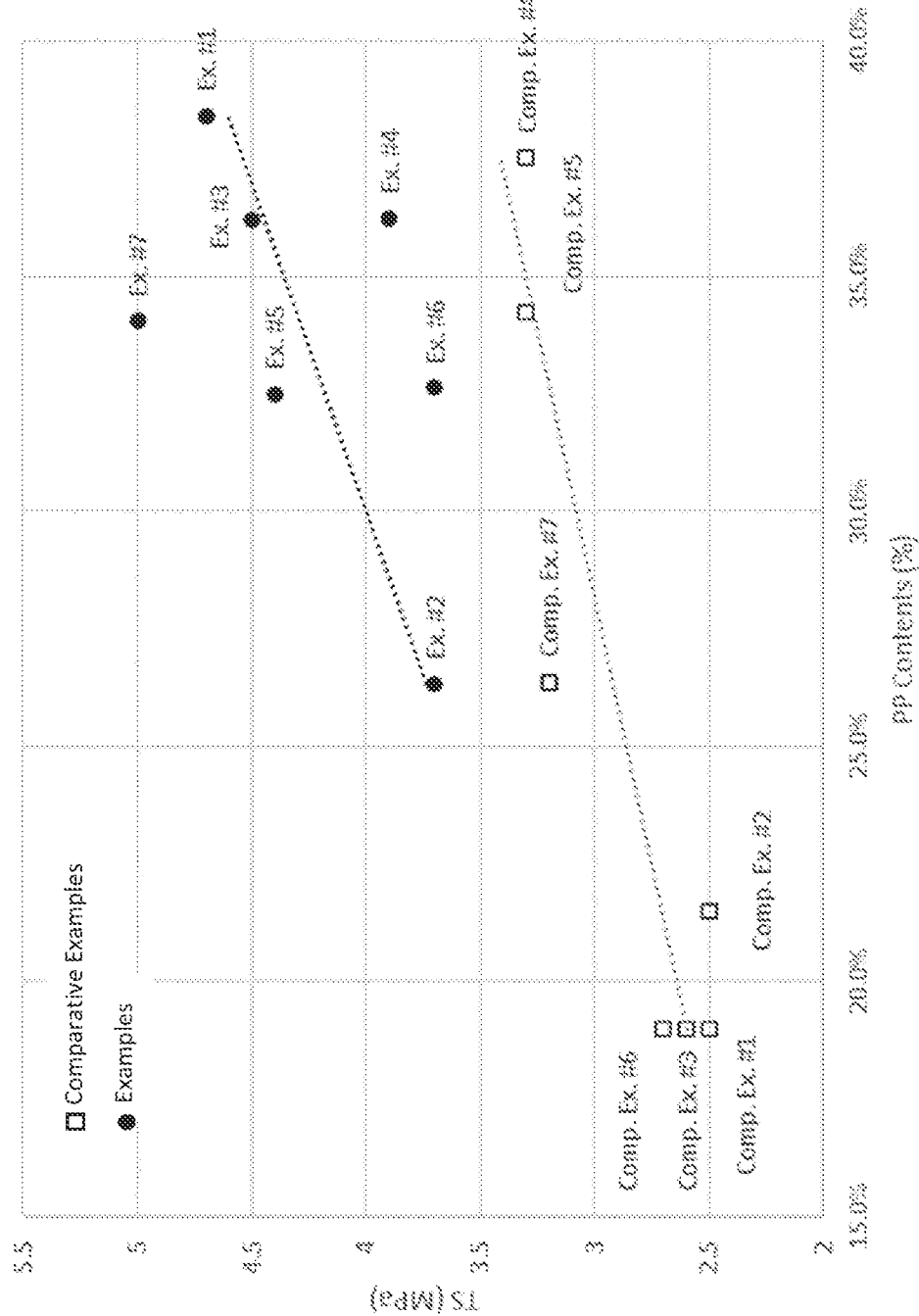

THERMOPLASTIC ELASTOMER WITH ADHESION TO CROSS-LINKED ETHYLENE PROPYLENE DIENE RUBBERS

TECHNICAL FIELD

The present invention relates to a thermoplastic elastomer (TPE) with an excellent adhesion to cross-linked ethylene propylene diene rubber (EPDM) or rubber mixtures containing cross-linked EPDM. In addition, the present invention also relates to the use of the thermoplastic elastomer according to the invention for producing a composite material with cross-linked ethylene propylene diene rubber (EPDM) or rubber mixtures containing cross-linked EPDM, as well as an article that comprises a thermoplastic elastomer according to the invention and cross-linked ethylene propylene diene rubber (EPDM) or rubber mixtures containing cross-linked EPDM. The present invention also relates to a process for producing a thermoplastic elastomer.

BACKGROUND

In the state of the art, some thermoplastic elastomer (TPE) variants are to be found, which are used for adhesion to cross-linked diene rubber, especially EPDM. These are either TPV (thermoplastic vulcanizate) based on EPDM/polypropylene (PP) that is dynamically vulcanized, or TPS based on vulcanized SBC/cross-linked diene rubbers. Both types are known and are used in different applications. A preferred use of the variants is adhesion to cross-linked EPDM. Cross-linked EPDM is used for example as seal running around the area of the window pane on motor vehicle side doors. For technical production reasons the seal used for this is not already produced as a ring-shaped band, but as an interrupted band. However, in order that the seal running around along the window pane of a motor vehicle door is tight, both ends of the band must be tightly connected to each other. Until now this has frequently been achieved with one of the named TPEs. It is however known in the case of both the named TPE variants that they have both advantages and disadvantages.

Furthermore, it is also possible to vulcanize rubber onto rubber. For example, for this, the seal consisting of cross-linked EPDM is tightly connected at both ends with EPDM instead of TPE. In other words, EPDM is vulcanized onto the seal. This method has the disadvantage of long cycle times in comparison with the method with the TPE variants.

The TPEs used until now thus already exhibit a bleeding-out of plasticizers after a short period of weathering or irradiation with UV light. This bleeding-out, also alternatively called oiling-out, leads to unsightly black streaks on the paintwork due to leaked-out constituents washed down with rainwater, particularly in the case of light-coloured motor vehicles.

The TPE variant EPDM/PP furthermore has the disadvantage of only achieving good adhesion results on cross-linked EPDM at very high temperatures greater than 270° C. The process is therefore very energy-intensive, and at the same time the cooling time required and thus the cycle time are increased due to the high processing temperature.

The TPE variant based on SBC, with good adhesion, has the disadvantage of being sticky vis-à-vis glass or exhibiting a high degree of friction vis-à-vis glass. When used in motor vehicle window pane seals, this can become a disadvantage as there is a direct contact with the glass pane and the pane also moves over the TPE. The friction is increased by weathering and UV exposure which the motor vehicle experiences due to natural, external influences; the SBC material slowly becomes sticky. In order to achieve a sufficient adhesion to EPDM, low-molecular-weight (sticky) SBCs are used, which have the disadvantage that, in the course of time, they migrate onto the surface. It has been shown that, in the course of time, the friction vis-à-vis glass is further increased. If, however, SBCs having a higher molecular weight are taken, then it is necessary to blend it with specific double bond containing polymers which are then vulcanized.

Various classes of thermoplastic elastomers are known to a person skilled in the art. The TPEs described herein follow the definitions of DIN EN ISO 18064. As described in DIN EN ISO 18064 under 3.1, TPEs are differentiated into two main classes. A TPE can consist of a polymer or a polymer mixture (blend).

Furthermore, according to the named DIN EN ISO 18064, TPEs have properties that are similar to those of vulcanized rubber at the temperature of use, but can be processed and worked up at raised temperatures like a thermoplastic material.

TPEs which only consist of one polymer are almost exclusively block copolymers (for example TPEs based on polyamide (TPA), TPEs based on copolyester (TPC), TPEs based on polystyrene (TPS), or TPEs based on polyurethane (TPU)). Polymer mixtures generally consist of an elastomer and a thermoplastic (for example TPS (TPE based on styrene block copolymers)). Furthermore, numerous mixed forms from both classes are known to a person skilled in the art. DIN EN ISO 18064 categorizes these under TPZ. Notwithstanding this standard, the designation TPZ will not be used in the present specification. Thus, commercially available TPSs are often not present as pure block copolymers, but more often as blends of styrene block copolymers and thermoplastics. Nevertheless, they are referred to (herein) as TPSs, notwithstanding the standard.

SUMMARY

The object of the present invention was therefore to provide a thermoplastic elastomer which does not exhibit the named disadvantages, or only to a very slight extent, in particular to provide a composition which has a permanent adhesion to cross-linked EPDM surfaces or to surfaces of rubber mixtures containing cross-linked EPDM, is suitable for external use, and no bleeding-out of plasticizers.

The object of the present invention is solved by a thermoplastic elastomer (TPE) comprising a styrene block copolymer (SBC) and a non-elastomeric polyolefin, wherein the non-elastomeric polyolefin has a melt flow rate MFR of more than 5 g/10 min, a crystallization endset temperature $Tc_{endset}$ of equal to or less than 110° C., and a crystallization onset temperature $Tc_{onset}$, in the range of more than 100° C. and less than 130° C., with the proviso that the crystallization endset temperature $Tc_{endset}$ is smaller than the crystallization onset temperature $Tc_{onset}$. When adjusting the aforementioned parameters within this ranges, it is possible to obtain a thermoplastic elastomer which has an excellent adhesion to cross-linked EPDM or rubber mixtures containing cross-linked EPDM, and which is within a Shore A hardness range which allows its use in the automobile industry, especially in the field of seals.

According to the present invention the crystallization onset temperature and the crystallization endset temperature are determined according to ASTM D 3418-03 (edition approved on Dec. 1, 2003; published in January 2004) by using a Mettler XS3DU as the differential scanning calorimetry (DSC) device. The term "crystallization endset temperature $Tc_{endset}$" used within this application is to be equated to the term "$T_{efc}$=crystallization extrapolated end temperature" in ASTM D 3418-03. The term "crystallization onset temperature $Tc_{onset}$" used within this application is to be equated to the term "$T_{eic}$=crystallization extrapolated onset temperature" in ASTM D 3418-03. The full content of ASTM D 3418-3 is herewith inserted by reference into this application. Further details used within the DSC measurements are described in the chapter "Methods of determination and definitions:" below.

In a further embodiment of the thermoplastic elastomer according to the invention it is preferred that the difference between the $Tc_{onset}$ and the $Tc_{endset}$ ($\Delta(Tc_{onset}-Tc_{endset})$) of the non-elastomeric polyolefin is equal to or more than 10° C. It is even more preferred that $\Delta(Tc_{onset}-Tc_{endset})$ is in the range of equal to or more than 10° C. and less than 30° C., preferably in the range of equal to or more than 10° C. and less than 20° C., and more preferably in the range of equal to or more than 10° C. and less than 15° C.

In a further embodiment of the thermoplastic elastomer according to the invention it is preferred that the melt flow rate (MFR) of the non-elastomeric polyolefin is in the range of more than 5 g/10 min and less than 200 g/10 min, preferably in the range of more than 5 g/10 min and less than 180 g/10 min, and more preferably in the range of more than 5 g/10 min and less than 150 g/10 min. Such a range for the MFR is advantageous for reasons of excellent processability of the thermoplastic elastomer according to the present invention.

According to the present invention the melt flow rate (MFR) is measured in accordance with DIN/ISO 1133-2 (First edition 2011 Dec. 1) by using a Gottfert MI-4 as the melt flow rate device.

In a further embodiment of the thermoplastic elastomer according to the invention it is preferred, that the $Tc_{endset}$ of the non-elastomeric polyolefin is in the range of equal to or less than 110° C. and more than 70° C., preferably in the range of equal to or less than 110° C. and more than 80° C., and more preferably in the range of equal to or less than 110° C. and more than 85° C.

According to a further embodiment of the thermoplastic elastomer of the present invention, it is preferred that the $Tc_{onset}$ of the non-elastomeric polyolefin is in the range of more than 100° C. and less than 120° C.

In a further embodiment of the thermoplastic elastomer according to the present invention it is preferred, that the thermoplastic elastomer has a Shore A hardness in the range of 50 to 90, preferably in the range of 60 to 88.

The thermoplastic elastomer according to the present invention may further comprise one or more fillers. Fillers according to the invention are inorganic materials, preferably minerals, mineral salts, glasses, glass fibers, and metal pastes. Examples thereof are described below.

It is preferred that the SBC used in the thermoplastic elastomer according to the present invention comprises at least one polystyrene block, and at least one polyolefin block. Examples thereof are described below.

The non-elastomeric polyolefin in the thermoplastic elastomer according to the invention is preferably a thermoplastic. Examples thereof are described below.

The composition according to the invention can furthermore contain a plasticizer and/or an oil which serves to keep the composition soft in order to improve the function as seal.

The composition according to the invention can also contain one or more of the following additives: anti-oxidants, UV stabilizers, lubricants, auxiliary materials.

In a further embodiment of the thermoplastic elastomer according to the present invention, the thermoplastic elastomer may further comprise a low molecular weight polymer which is different to the styrene block copolymer and/or the non-elastomeric polyolefin, and/or other polymers that may be present in the thermoplastic elastomer. The low molecular weight polymer helps to increase the contact interface between the thermoplastic elastomer and the rubber.

In a further embodiment of the thermoplastic elastomer according to the present invention, the thermoplastic elastomer may further comprise a pigment, such as for instance carbon black.

The composition according to the invention may also contain a surface agent to improve surface feel and scratch and/or mar resistance.

Examples of plasticizers/oils, additives, fillers, low molecular weight polymers, surface agents, and pigments are also named below.

In a further embodiment of the thermoplastic elastomer according to the present invention, the thermoplastic elastomer consists of a styrene block copolymer (SBC) and a non-elastomeric polyolefin, wherein the non-elastomeric polyolefin has a melt flow rate MFR of more than 5 g/10 min, a crystallization endset temperature $Tc_{endset}$ of equal to or less than 110° C., and a crystallization onset temperature $Tc_{onset}$ in the range of more than 100° C. and less than 130° C., with the proviso that the crystallization endset temperature $Tc_{endset}$ is smaller than the crystallization onset temperature $Tc_{onset}$ and optionally of one or more of the components selected from the group consisting of oils/plasticizers, fillers, additives, pigments, surface agents, epoxy resins, and low molecular weight polymers. All of these components are further explained and exemplified below.

The composition according to the invention has improved adhesion vis-à-vis crosslinked EPDM or rubber mixtures containing cross-linked EPDM. It is known to a person skilled in the art that, in addition to the cross-linked EPDM, a rubber mixture containing EPDM may contain further ingredients such as for example fillers, plasticizers, processing agents, stabilizers such as antioxidants, anti-UV agents, antiozonants and the cross-linking system (also called vulcanization system) as well as other additives such as for example adhesion promoters, propellants, flame retardants.

The TPE according to the invention adheres to cross-linked EPDM or rubber mixtures containing cross-linked EPDM through a good compatibility of TPE and EPDM, and further through the crystalline build-up of the TPE to the EPDM matrix. The proposed bonding mechanism here is the formation of mechanical interlocks upon molding, where the crystallites of the non-elastomeric polyolefin (NPO) extend into the EPDM matrix from the interface and thus, forming "anchors" between EPDM and TPE.

The present invention also relates to a thermoplastic elastomer according to the invention for producing an article/composite material with cross-linked EPDM or mixtures containing cross-linked EPDM. In other words, the present invention also relates to a method of producing an article/composite material, wherein a thermoplastic elastomer according to the invention is adhered to cross-linked EPDM or rubber mixtures containing cross-linked EPDM. In other words, the present invention also relates to the use of a thermoplastic elastomer according to the present invention for producing an article, e.g. in the form of a composite material, made of the thermoplastic elastomer according to the invention and a cross-linked EPDM or a rubber mixture containing cross-linked EPDM, wherein the thermoplastic elastomer is adhered to the cross-linked EPDM or the rubber mixture containing cross-linked EPDM. In the use according to the invention or the process according to the invention, injection moulding, multi-component injection moulding, injection moulding around inserts, extrusion or compression moulding is used as processing method for producing the articles, wherein injection moulding, injection moulding around inserts and extrusion are preferred, and injection moulding around inserts is quite particularly preferred.

Thus, the present invention also relates to an article (overmolded composite material) that comprises a thermoplastic elastomer according to the invention and the cross-linked EPDM or rubber mixtures containing cross-linked EPDM.

By a "cross-linked EPDM" or "rubber mixture containing cross-linked EPDM" is meant herein an ethylene propylene diene rubber which is a terpolymer which is cross-linked. EPDM belongs to the random copolymers with saturated polymer main chain framework and double bonds in the side chain, which can serve to cross-link the EPDM by means of the vulcanization system. The production of cross-linked EPDM preferably takes place with metallocene or Ziegler-Natta catalysts based on vanadium compounds and aluminium alkyl chlorides. As diene, unconjugated dienes are used, only one double bond of which takes part in the polymer chain formation, with the result that further double bonds remain outside the direct basic chain framework and can be cross-linked with sulphur, peroxide or phenolic. As diene component, dicyclopentadiene (DCP), 1,4-hexadiene or ethylidene norbornene (ENB, IUPAC: 5-ethylidene-2-norbornene) are used. The dienes differ with respect to the cross-linking speed. DCP has the lowest, ENB the highest reactivity. The EPDM is preferably one which has been cross-linked with sulphur.

The present invention also relates to a method of producing a thermoplastic elastomer, wherein a styrene block copolymer and a non-elastomeric polyolefin are blended together, wherein the non-elastomeric polyolefin has a melt flow rate MFR of more than 5 g/10 min, a crystallization endset temperature $Tc_{endset}$, of equal to or less than 110° C., and a crystallization onset temperature $Tc_{onset}$ in the range of more than 100° C. and less than 130° C., with the proviso that the crystallization endset temperature $Tc_{endset}$ is smaller than the crystallization onset temperature $Tc_{onset}$. All the preferred features of the above-named thermoplastic elastomer according to the invention are also features preferred for the thermoplastic elastomer produced or used in the process (es) according to the invention. In a preferred embodiment, the thermoplastic elastomer produced in the process according to the invention is the thermoplastic elastomer according to the invention.

In a further embodiment of the present invention, it is preferred that the components used in the process according to the invention are blended together at a temperature above the melting or softening point of the non-elastomeric polyolefin.

The present invention therefore also relates to a thermoplastic elastomer which has been produced by the process according to the invention, in which the components used have been blended at a temperature above the melting or softening point of the non-elastomeric polyolefin.

BRIEF DESCRIPTION OF THE DRAWING

The disclosure will now be described with reference to the drawing wherein:

The drawing shows a diagram of the comparison between the Examples and the Comparative Examples with respect to bonding strength.

DESCRIPTION OF EXEMPLARY EMBODIMENTS

As may be seen from the drawing, higher contents of the NPO ("PP content" in the diagram) leads to a higher bonding strength.

Moreover, the TPEs according to the invention are also higher in bonding strength than the TPEs according to the state of the art.

The process according to the invention for producing a thermoplastic elastomer composition is described in more detail below:

The thermoplastic elastomer according to the present invention can be produced by blending/mixing the components named below, A, B, C, D, E, F, G, and H—insofar as they are present in the compositions. The mixing can take place using mixing systems known in rubber technology and plastic technology such as kneaders, internal mixers, e.g. internal mixers with intermeshing or tangential rotor geometry (This type of mixing/compounding for TPE is very old method and is not used anymore these days. It is only used for rubber compounding) as well as also in continuous mixing equipment such as mixing extruders, e.g. mixing extruders with 2 to 4 or more shaft screws (e.g. twin-screw extruders).

When carrying out the production process according to the invention it is important to ensure that the mixing temperature is sufficiently high that component B (non-elastomeric polyolefin) can be transformed into the plastic state but is not damaged in the process. This is guaranteed if a temperature above the melting or softening temperature of component B is selected. The components—insofar as they are present in the compositions—are particularly preferably mixed at a temperature in the range from 50° C. to 270° C., preferably 50° C. to 250° C., particularly preferably 50° C. to 240° C. The period for the blending/mixing at the temperatures indicated lies in the range from 0.5 min to 2 min. The composition is then cooled to room temperature.

Before blending in the process according to the invention, the components A, B, C, D, E, F, G, and H—insofar as they are contained in the thermoplastic elastomer according to the invention—are preferably provided jointly and intimately mixed at temperatures above the melting or softening temperatures of component B. A continuous mixing unit, such as e.g. an extruder or a twin-screw extruder, is particularly preferred for the production. By means of the named procedure, it is achieved that after the completion of production, the composition undergoes the finest and most homogeneous distribution possible of the components used.

The thermoplastic elastomers according to the invention are outstandingly suitable for providing thermoplastic elastomers with very good properties, in particular with very good UV resistance, low friction with simultaneously very good elastic properties (compression set, elongation at break and tensile strength). Furthermore, the compositions according to the invention have very little to no tendency to the oiling-out of plasticizers. In addition they exhibit an excellent adhesion to cross-linked EPDM or rubber mixtures containing cross-linked EPDM.

The terms "comprise", "contain" and "have" used in the present application are meant in each case where they are used to also cover the term "consist of", with the result that these embodiments are also disclosed in this application.

The components named above and used in the thermoplastic elastomer compositions according to the invention or the processes according to the invention are abbreviated by the following letters and are described in more detail below:

A: Styrene Block Copolymer (SBC)
B: Non-elastomeric polyolefin (NPO)
C: Oil/Plasticizer
D: Filler
E: Additives
F: Carbon Black
G: Surface Agent
H: Low molecular weight polymer Component A: Styrene Block Copolymer (SBC)

As already described above, SBCs consist of various polymer blocks, of which at least one block is a polystyrene block and at least one block is a polyolefin block. An SBC preferably has the structure of a triblock copolymer, in which the middle block is a polyolefin block, more preferably an ethylene/propylene, ethylene/butylene, ethylene/isoprene or isobutylene block. Further preferably, the SBC is a saturated polymer, i.e. a polymer that has been hydrogenated. Preferably the SBC used in the present invention has a weight average molecular weight of 80,000 to 300,000 g/mol.

An example of an SBC according to the invention is SEBS (polystyrene-block-poly(ethylene-co-butylene)-block-polystyrene). A further example of an SBC which can be used according to the invention and is not cross-linked is SEEPS (polystyrene-block-poly(ethylene-co-(ethylene-propylene))-block-polystyrene). In addition, further examples of SBCs which can be used according to the invention and are not cross-linked are SEPS (polystyrene-block-poly(ethylene-co-propylene)-block-polystyrene) and SIBS (polystyrene-block-polyisobutylene-block-polystyrene). Moreover, all further known SBCs which have been hydrogenated and thus contain no C—C double bonds or are already present double bond-free after the polymerization are also to be named here as examples. Furthermore, all non-hydrogenated SBCs such as for example SBS, SIS, SIBS are however also to be named as examples according to the invention. SEBS is quite particularly preferred as SBC according to the invention. Examples of hydrogenated or saturated SBCs to be used according to the invention are known by the trade names Kraton®, Septon®, Globalprene®, Europrene®, Taipol®, Tuftec™, Sibstar® and Hybrar® and are commercially available.

The SBC is present in the thermoplastic elastomer according to the invention preferably in a weight proportion in the range from 15 to 75 wt.-%, more preferably in the range from 20 to 70 wt.-%, and most preferred in the range of from 25 to 65 wt.-%, relative to the total weight of the thermoplastic elastomer according to the invention.

Component B: Non-Elastomeric Polyolefin (NPO)

The non-elastomeric polyolefin used in the present invention can be any polyolefin that is suitable for the production of thermoplastic elastomers, as long as it has a melt flow rate MFR of more than 5 dg/min, a crystallization endset temperature $Tc_{endset}$ of equal to or less than 110° C., and a crystallization onset temperature $Tc_{onset}$ in the range of more than 100° C. and less than 130° C., with the proviso that the crystallization endset temperature $Tc_{endset}$ is smaller than the crystallization onset temperature $Tc_{onset}$. It is further preferred that the difference between the $Tc_{onset}$ and the $Tc_{endset}$ ($\Delta(Tc_{onset}-Tc_{endset})$) of the non-elastomeric polyolefin is equal to or more than 10° C. It is even more preferred that $\Delta(Tc_{onset}-Tc_{endset})$ is in the range of equal to or more than 10° C. and less than 30° C., preferably in the range of equal to or more than 10° C. and less than 20° C., and more preferably in the range of equal to or more than 10° C. and less than 15° C. Moreover, it is preferred that the melt flow rate (MFR) of the non-elastomeric polyolefin is in the range of more than 5 g/10 min and less than 50 g/10 min, preferably in the range of more than 5 g/10 min and less than 40 g/10 min, and more preferably in the range of more than 5 g/10 min and less than 35 g/10 min. The $Tc_{endset}$ of the non-elastomeric polyolefin is preferably in the range of equal to or less than 110° C. and more than 70° C., more preferably in the range of equal to or less than 110° C. and more than 80° C., and even more preferably in the range of equal to or less than 110° C. and more than 85° C. The $Tc_{onset}$ of the non-elastomeric polyolefin is preferably in the range of more than 100° C. and less than 120° C.

The non-elastomeric polyolefin is preferably a thermoplastic polyolefin. The non-elastomeric polyolefin is preferably a polypropylene or a copolymer of ethylene and propylene, more preferably a polypropylene.

The polypropylene is preferably a homopolymer of polypropylene.

The copolymer of propylene and ethylene is preferably a random copolymer.

According to the invention, combinations of the named polymers can also be used.

Polyolefins suitable for the invention are above all those which are suitable for processing in injection moulding. Suitable polyolefins are those with good flow properties and rigidity.

Homopolymers of propylene (hPP) are commercially available and each of these available hPPs can be used according to the invention.

Random polypropylene copolymers (rPP) are also commercially available and each of these rPPs can be used according to the invention. Ethylene and/or butene are preferred as comonomer.

However, it is particularly preferred according to the invention that the non-elastomeric polyolefin is one which comprises propylene in its repeat units.

The non-elastomeric polyolefin is preferably used in a quantity such that the weight ratio of SBC (component A) to the non-elastomeric polyolefin (component B) in the thermoplastic elastomer according to the invention lies in the range from 3:1 to 0.4:1, more preferably in the range from 2.5:1 to 0.5:1, and even more preferably in the range from 2:1 to 0.6:1.

Component C: Oil/Plasticizer

Suitable plasticizers are in principle known to a person skilled in the art. Suitable plasticizers according to the invention are mineral or white oils, preferably linear paraffinic oil.

Mixtures of the substance classes described can also be used as suitable plasticizers.

Examples of commercially available plasticizers are Chevron Paralux 6001 from Chevron, and Shell Catenex T 145 S from Shell. The plasticizer—insofar as it is present—is preferably used in a quantity such that the weight ratio of SBC (component A) to the oil/plasticizer (component C) in the thermoplastic elastomer according to the invention lies in the range from 5:1 to 1:2, and more preferably in the range from 4:1 to 1.3:2.

Component D: Filler

Examples for fillers used in the present invention are calcium carbonate, talc, wollastonite, mica, kaolin, silica, dolomite, barium sulphate, ATH Al(OH)$_3$, MDH Mg(OH)$_2$, diatomaceous earth, magnetite/hematite, halloysite, zinc oxide, hydrotalcite, zeolites and titanium dioxide, etc.

Suitable commercially available fillers for the present invention are e.g. Hubercarb G6 from Huber.

Even if it is not detrimental to use fillers in the present invention depending on the requirements of the thermoplastic elastomer to be used, it is preferred that no fillers are used according to the present invention.

Component E: Additives

Additives in the context of the present invention are: processing auxiliary materials; stabilizers; metal soaps; fatty acids and fatty acid derivatives; paraffin waxes; microcrystalline waxes; flame retardants (fire protection agents); adhesive agents and adhesion promoters; tracers; minerals (excluding the minerals listed under the component D: fillers); crystallization accelerators; dyes and colour masterbatches (excluding pigments); retarders; biocides; fungicides; metal deactivators; anti-fogging agents; antistatics; and lubricants.

Examples for processing auxiliary materials are: release agents; dispersants; anti-blocking agents; and viscosity modifiers.

Examples for stabilizers are: anti-ageing agents; UV-stabilizers; antiozonants such as antiozonant waxes; antioxidants, e.g. substituted phenols, substituted bisphenols, dihydroquinolines, diphenylamines, phenylnaphthylamines, paraphenylenediamines, and benzimidazoles; heat stabilizers; and stabilizers against weathering.

Most preferred additives are:

UV stabilizers and other light stabilizers, and antioxidants are particularly preferably used as auxiliary materials.

Additives—insofar as they are present—are preferably used in a quantity such that the weight ratio of SEC (component A) to the additives (component E) in the thermoplastic elastomer according to the invention lies in the range from 85:1 to 25:1, more preferably in the range from 80:1 to 30:1.

Component F: Pigment

The pigment used in the thermoplastic elastomer according to the present invention may be any pigment which is usable for thermoplastic elastomers. Examples for pigments used in the thermoplastic elastomer according to the present invention are e.g. carbon black, graphite, carbon nanofibrils, Lithopone, zinc oxide, iron oxide, ultramarine blue, chromium oxide, and antimony sulphite. An example for carbon black used in the thermoplastic elastomer according to the invention is Carbon Black Masterbatch PE-543CA from MDI.

The pigment—insofar as it is present—is preferably used in a quantity such that the weight ratio of SBC (component A) to the pigment (component F) in the thermoplastic elastomer according to the invention lies in the range from 10:2 to 10:0.1, more preferably in the range from 10:1.5 to 10:0.2.

Component G: Surface Agent

Surface agents are components which modify the surface of the thermoplastic elastomer according to the invention without having any adverse effects on the mechanical properties. Surface agents are used in the present application for reasons of improvement of the scratch resistance, enhancement of surface gloss, surface resistance, smoothness touch feel, or for reasons of improving mold release property Surface agents for the thermoplastic elastomer according to the present invention are selected from the group consisting of fumed silica, polysiloxanes, or master batches of such.

Examples of such surface agents are WACKER Genioplast P Plus, Dow Corning MB50, JAVACHEM HG-600S, and JAVACHEM HG-600.

The surface agent—insofar as it is present—is preferably used in a quantity such that the weight ratio of SBC (component A) to the surface agent (component G) in the thermoplastic elastomer according to the invention lies in the range from 10:1 to 10:0.1, more preferably in the range from 10:0.7 to 10:0.2.

Component H: Low Molecular Weight Polymer

One example for an adhesion promotor preferably used in the thermoplastic elastomer according to the invention is a low molecular weight polymer which is different from the non-elastomeric polyolefin and/or the SBC and/or other polymers that may be present in the thermoplastic elastomer of the present invention. Preferably, a polymer comprising propylene units is used. The low molecular weight polymer may be a polyolefin, such as a polypropylene. More preferred is a low isotactic polypropylene which was prepared in the presence of a metallocene catalyst. Most preferred is a propylene homopolymer.

The low molecular weight polymer is preferably one with a melt flow rate above 50 g/10 min, preferably above 150 g/10 min, and most preferred above 250 g/10 Min. It is further preferred that no crystallization temperature of the low molecular weight polymer is detectable via differential scanning calorimetry (DSC). The term "low molecular weight" with respect to the low molecular polymer—as herein used—is to be understood as having a weight-average molecular weight M, of less than 130.000 g/mol, especially less than 100.000 g/mol. E.g. L-Modu S600 from Idemitsu may be used as the low molecular weight polymer. The melt viscosity at 190° C. is preferably within $10^3$ to $10^6$ mPa. Furthermore, the melting point of the low molecular weight polymer is preferably in the range of 50° C. to 100° C.

The low molecular weight polymer—insofar as it is present—is preferably used in a quantity such that the weight ratio of SBC (component A) to the low molecular weight polymer (component H) in the thermoplastic elastomer according to the invention lies in the range from 10:4 to 10:0.2, more preferably in the range from 10:3 to 10:0.5.

The present invention will now be explained in more detail by means of the following embodiment examples. The following embodiment examples are only exemplary in nature and do not serve to limit the present invention thereto.

Embodiment Examples

Methods of Determination and Definitions:

Determination of the Shore hardness takes place according to DIN ISO 7619-1 (2012).

By "tensile strength" is meant the maximum mechanical tensile stress which a material withstands before it breaks/tears. In the tensile test it is calculated from the maximum tensile force achieved relative to the original cross section of the (standardized) sample and indicated in MPa.

The adhesion of the thermoplastic elastomers to EPDM (type: AA7DOZ; manufacturer: Gummiwerk Kraiburg) is determined as follows:

Firstly, plaques of the thermoplastic elastomer with dimensions of 150×100×2 $mm^3$ were injection molded using an injection molding machine equipped with a standard polyolefin screw with a diameter of 40 mm and an L/D ratio of 20. The barrel temperature used was 200° C. and the mold temperature 35° C. The injection rate was 38 $mm^3$/sec. In order to evaluate the adhesion strength of the thermoplastic elastomer to a vulcanized EPDM, the S2 tensile test specimen was employed. The specimen is composed of thermoplastic elastomer in one side and EPDM in the other side. The tensile stress required for separation between two materials at the interface was determined as the adhesion strength of thermoplastic elastomer to EPDM. The plaques of the thermoplastic elastomer (150 mm×100 mm×2 mm) for the test specimens are molded where the thermoplastic elastomer is injected to the cavity that contains an EPDM insert (100 mm×50 mm×2 mm). The S2 specimens are cut out of the molded plaques both in flow direction and transverse direction. The measurement is made in that the S2 specimens are clamped in a tensile testing machine and the tensile strength needed to separate both materials is measured.

The crystallization onset temperature and the crystallization endset temperature are determined according to ASTM D 3418-03 (edition approved on Dec. 1, 2003; published in January 2004) by using a Mettler XS3DU as the differential scanning calorimetry device.

The melt flow rare (MFR) is measured in accordance with DIN/ISO 1133-2 (First edition 2011 Dec. 1) by using a Gottfert MI-4 as the melt flow rate device.

The following materials are used in the examples:

TABLE 1

| Component | Raw material |
|---|---|
| A | Styrene Block Copolymer (SBC) |
| B | Non-elastomeric polyolefin (NPO) |
| C | Oil/Plasticizer |
| D | Filler |
| E | Additives |
| F | Pigment |
| G | Surface Agent |
| H | Low molecular weight polymer |

Examples 1 to 7 and Comparative Examples 1 to 7: Production of a Thermoplastic Elastomer According to the Invention and According to the State of the Art Thermoplastic elastomers with the components and the amounts shown in Tables 2 to 6 are produced according to the above-named production process. A twin-screw extruder with a screw diameter of 60 mm and L/D ratio balanced for the specific product is used for blending the components used. The screw rotation speed was 600 min$^{-1}$. The compounding temperature was maintained below 230° C.

TABLE 2

Compositions

| Raw material | Component | Comparative Example 1 Weight-% | Comparative Example 2 Weight-% | Comparative Example 3 Weight-% | Comparative Example 4 Weight-% | Comparative Example 5 Weight-% |
|---|---|---|---|---|---|---|
| SBC1 | A | 22.073 | 24.998 | 22.073 | | |
| SBC7 | | | | | 26.049 | 26.746 |
| NPO1 | B | | | 18.983 | | |
| NPO2 | | | | | 37.511 | 34.235 |
| NPO3 | | 18.983 | | | | |
| NPO4 | | | 21.498 | | | |
| Plasticizer/oil | C | 42.601 | 48.245 | 42.601 | 29.956 | 29.955 |
| Filler1 | D | 11.699 | | 11.699 | | |
| Filler2 | | | | | 2.084 | 2.140 |
| Additive1 | E | 0.099 | 0.112 | 0.099 | 0.109 | 0.112 |
| Additive2 | | 0.099 | 0.112 | 0.099 | 0.109 | 0.112 |
| Additive3 | | 0.228 | 0.259 | 0.228 | 0.208 | 0.214 |
| Additive4 | | 0.119 | 0.135 | 0.119 | 0.104 | 0.107 |
| Additive5 | | 0.119 | 0.135 | 0.119 | 0.104 | 0.107 |
| Additive6 | | 0.050 | 0.056 | 0.050 | 0.052 | 0.053 |
| Additive7 | | 0.022 | 0.025 | 0.022 | 0.065 | 0.067 |
| Pigment | F | 3.752 | 4.25 | 3.752 | 2.865 | 2.942 |
| Surface Agent1 | G | | | | 0.781 | 0.802 |
| Surface Agent3 | | | | | | 2.407 |
| Epoxy Resin | | 0.155 | 0.175 | 0.155 | | |
| Hardness (Shore A) | | 67 | 70 | 71 | 80 | 77 |
| Tensile strength (MPa) (adhesion on EPDM) | | 2.5 | 2.5 | 2.6 | 3.3 | 3.3 |

TABLE 3

Compositions

| Raw material | Component | Comparative Example 6 Weight-% | Comparative Example 7 Weight-% | Example 1 Weight-% | Example 2 Weight-% |
|---|---|---|---|---|---|
| SBC1 | A | 22.074 | | | |
| SBC2 | | | | | 11.083 |
| SBC3 | | | 23.964 | | |
| SBC4 | | | | | 16.625 |

TABLE 3-continued

Compositions

| Raw material | Component | Comparative Example 6 Weight-% | Comparative Example 7 Weight-% | Example 1 Weight-% | Example 2 Weight-% |
|---|---|---|---|---|---|
| SBC6 | | | | 3.841 | |
| SBC7 | | | | 34.569 | |
| NPO4 | | | | | |
| NPO5 | B | 18.983 | 26.360 | | |
| NPO6 | | | | 38.410 | |
| NPO7 | | | | | 26.323 |
| Plasticizer/oil | C | 42.601 | 43.134 | 11.523 | 41.563 |
| Filler1 | D | 11.699 | | | |
| Additive1 | E | 0.099 | 0.069 | 0.096 | 0.111 |
| Additive2 | | 0.099 | 0.069 | 0.096 | 0.111 |
| Additive3 | | 0.228 | 0.161 | 0.211 | 0.221 |
| Additive4 | | 0.119 | 0.084 | 0.096 | 0.097 |
| Additive5 | | 0.119 | 0.084 | 0.096 | 0.097 |
| Additive6 | | 0.050 | 0.036 | 0.058 | 0.055 |
| Additive7 | | 0.022 | 0.048 | 0.058 | 0.069 |
| Low molecular weight polymer | H | | 6.941 | | |
| Pigment | F | 3.752 | 3.595 | 2.497 | 2.854 |
| Surface Agent1 | G | | | | 0.790 |
| Surface Agent2 | | | 2.396 | | |
| Surface Agent3 | | | | 1.536 | |
| Epoxy Resin | | | | | |
| Hardness (Shore A) | | 67 | 79 | 82 | 76 |
| Tensile strength (MPa) (adhesion on EPDM) | | 2.7 | 3.2 | 4.7 | 3.7 |

TABLE 4

| Raw material | Component | Example 3 Weight-% | Example 4 Weight-% | Example 5 Weight-% | Example 6 Weight-% | Example 7 Weight-% |
|---|---|---|---|---|---|---|
| SBC6 | A | | 16.927 | | | |
| SEC7 | | 25.847 | 16.927 | 56.007 | 61.561 | 26.186 |
| NPO7 | B | 36.186 | 36.225 | | | |
| NPO8 | | | | 32.484 | 32.627 | |
| NPO9 | | | | | | 34.041 |
| Plasticizer/oil | C | 29.724 | 25.391 | | | 28.804 |
| Additive1 | E | 0.109 | 0.108 | 0.112 | 0.111 | 0.110 |
| Additive2 | | 0.109 | 0.108 | 0.112 | 0.111 | 0.110 |
| Additive3 | | 0.207 | 0.203 | 0.196 | 0.197 | 0.209 |
| Additive4 | | 0.103 | 0.108 | 0.112 | 0.111 | 0.105 |
| Additive5 | | 0.103 | 0.108 | 0.112 | 0.111 | 0.105 |
| Additive6 | | 0.052 | 0.051 | 0.056 | 0.554 | 0.052 |
| Additive7 | | 0.065 | 0.051 | 0.056 | 0.554 | 0.065 |
| Low molecular weight polymer | H | 3.877 | | 6.721 | | 6.546 |
| Pigment | F | 2.843 | 2.268 | 2.520 | 2.524 | 2.880 |
| Surface Agent1 | G | 0.775 | | | | 0.786 |
| Surface Agent3 | | | 1.523 | 1.512 | 1.539 | |
| Hardness (Shore A) | | 78 | 82 | 79 | 80 | 94 |
| Tensile strength (MPa) (adhesion on EPDM) | | 4.5 | 3.9 | 4.4 | 3.7 | >5 |

TABLE 5

Raw materials used

| Raw material | Component | SUPPLIER/Grade name |
|---|---|---|
| SBC1 | A | KURARAY Septon 4077 |
| SBC2 | | TSRC TAIPOL SEBS 6151 |
| SBC3 | | LCY Globalprene 7551 |
| SBC4 | | KRATON G 1650 MU |
| SBC5 | | KRATON G 1654 HU |
| SBC6 | | KRATON G 1641 HU |
| SBC7 | | KRATON G 1645 MO |
| NPO1 | B | BRASKEM F006EC2 |
| NPO2 | | BOREALIS Bopure RG466MO |
| NPO3 | | LYONDELLBASELL Moplen HP400H |
| NPO4 | | ESENTTIA 05H82-AV |
| NPO5 | | BRASKEM RP650 |
| NPO6 | | TOTAL PPR8573 |
| NPO7 | | LG CHEM Lucene MH7700 |
| NPO8 | | TOTAL Lumicene M6571 |
| NPO9 | | TOTAL Lumicene M8825KZ |
| Oil/Plasticizer | C | CHEVRON Paralux 6001 |
| Filler1 | D | HUBER Hubercarb G6 |

TABLE 5-continued

Raw materials used

| Raw material | Component | SUPPLIER/Grade name |
|---|---|---|
| Filler2 | | MISTRON R20G |
| Additive1 | E | BASF Irgafos 168 |
| Additive2 | | BASF Irganox 1330 |
| Additive3 | | BASF Tinuvin 326 |
| Additive4 | | BASF Tinuvin 622SF |
| Additive5 | | BASF Chimassorb 944FDL |
| Additive6 | | SUMIMOTO Sumilizer GM |
| Additive7 | | CRODA Crodamide ER |
| Low molecular weight polymer | H | IDEMITSU L-Modu S600 |
| Pigment | F | MDI Carbon Black Masterbatch PE-543CA |
| Surface Agent1 | G | WACKER Genioplast P Plus |
| Surface Agent2 | | JAVACHEM HG-600S |
| Surface agent3 | | JAVACHEM HG-600 |
| Epoxy Resin | | Hexion EPON 1004F |

TABLE 6

| Raw material | MFI [dg/min] | $Tc_{endset}$ [° C.] | $Tc_{onset}$ [° C.] | Δ ($Tc_{onset}$ − $Tc_{endset}$) [° C.] |
|---|---|---|---|---|
| NPO1 | 0.5 | 101.25 | 112.93 | 11.68 |
| NPO2 | 30 | 113.3 | 126.8 | 13.5 |
| NPO3 | 2 | 105.2 | 120.0 | 14.8 |
| NFO4 | 5.5 | 116.9 | 125.5 | 8.6 |
| NPO5 | 2 | 110.6 | 121.8 | 11.2 |
| NPO6 | 7 | 86.87 | 100.29 | 13.45 |
| NPO7 | 25 | 107.0 | 117.0 | 10.0 |
| NPO8 | 9 | 94.68 | 106.06 | 11.38 |
| NPO9 | 30 | 104.7 | 117.1 | 12.4 |

As may be seen from Tables 2 to 4, compounds according to the invention provide a good compromise between Shore A hardness (not too hard) and an excellent adhesion to EPDM. However, when increasing the amount of NPO the adhesion strength of the thermoplastic elastomers increases. However, when a critical content of 25 w.-% of NPO is exceeded, the compounds which are not according to the invention showed a deterioration in the adhesion strength, or at least not much improvement, even with higher contents of NPO. In contrast to the that, the compounds according to the invention showed an increasing adhesion strength with higher contents of NPO.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A thermoplastic elastomer comprising a styrene block copolymer and a non-elastomeric polyolefin, wherein the non-elastomeric polyolefin has a melt flow rate MFR of more than 5 dg/min, a crystallization endset temperature $Tc_{endset}$ of equal to or less than 110° C., and a crystallization onset temperature $Tc_{onset}$ in the range of more than 100° C. and less than 130° C., with the proviso that the crystallization endset temperature $Tc_{endset}$ is smaller than the crystallization onset temperature $Tc_{onset}$.

2. The thermoplastic elastomer of claim 1, wherein Δ($Tc_{onset}$−$Tc_{endset}$) is equal to or more than 10° C.

3. The thermoplastic elastomer of claim 2, wherein Δ($Tc_{onset}$−$Tc_{endset}$) is in the range of equal to or more than 10° C. and less than 30° C.

4. The thermoplastic elastomer of claim 1, wherein the MFR is in the range of more than 5 g/10 min and less than 50 g/10 min.

5. The thermoplastic elastomer of claim 1, wherein the $Tc_{endset}$ is in the range of equal to or less than 110° C. and more than 70° C.

6. The thermoplastic elastomer of claim 1, wherein $Tc_{onset}$ is in the range of more than 100° C. and less than 120° C.

7. The thermoplastic elastomer of claim 1, wherein the thermoplastic elastomer has a Shore A hardness in the range of 50 to 100.

8. The thermoplastic elastomer of claim 1 wherein the weight ratio of styrene block copolymer to the non-elastomeric polyolefin lies in the range from 3:1 to 0.4:1.

9. The thermoplastic elastomer of claim 1, wherein the thermoplastic elastomer further comprises a low molecular weight polymer which is different to the non-elastomeric polyolefin, and/or which is different to the styrene block copolymer.

10. The thermoplastic elastomer of claim 9, wherein the low molecular weight polymer has a weight average molecular weight of less than 130,000 g/mol.

11. The thermoplastic elastomer of claim 9, wherein the low molecular weight polymer has a MFR above 50 g/10 min.

12. A method of producing a thermoplastic elastomer according to claim 1, wherein a styrene block copolymer and a non-elastomeric polyolefin are blended together, wherein the non-elastomeric polyolefin has a melt flow rate MFR of more than 5 dg/min, a crystallization endset temperature $Tc_{endset}$ of equal to or less than 110° C., and a crystallization onset temperature $Tc_{onset}$ in the range of more than 100° C. and less than 130° C., with the proviso that the crystallization endset temperature $Tc_{endset}$ is smaller than the crystallization onset temperature $Tc_{onset}$.

13. A thermoplastic elastomer according to claim 1 for producing a composite material with a cross-linked EPDM or a rubber mixture containing cross-linked EPDM.

14. An article (composite material) that comprises a thermoplastic elastomer according to claim 1 and a cross-linked EPDM or a rubber mixture containing cross-linked EPDM.

15. A method of producing an article according to claim 14, wherein the thermoplastic elastomer is adhered to a cross-linked EPDM or a rubber mixture containing cross-linked EPDM.

* * * * *